April 9, 1963 W. J. MELVILLE 3,084,579
CONTROL MEANS FOR REGISTRATION CONTROL DEVICE
Filed April 29, 1959 2 Sheets-Sheet 1
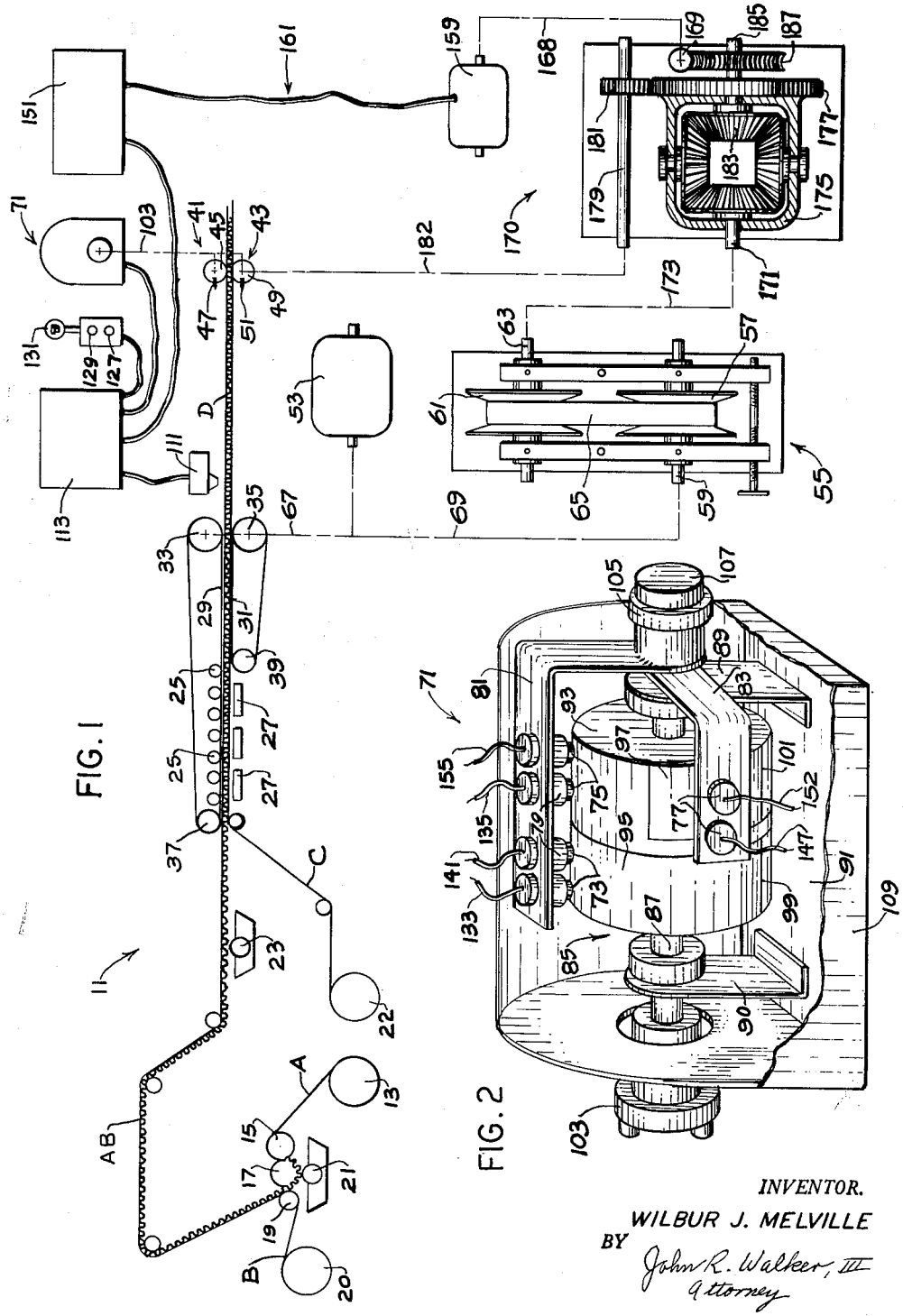
INVENTOR.
WILBUR J. MELVILLE
BY John R. Walker, III
Attorney

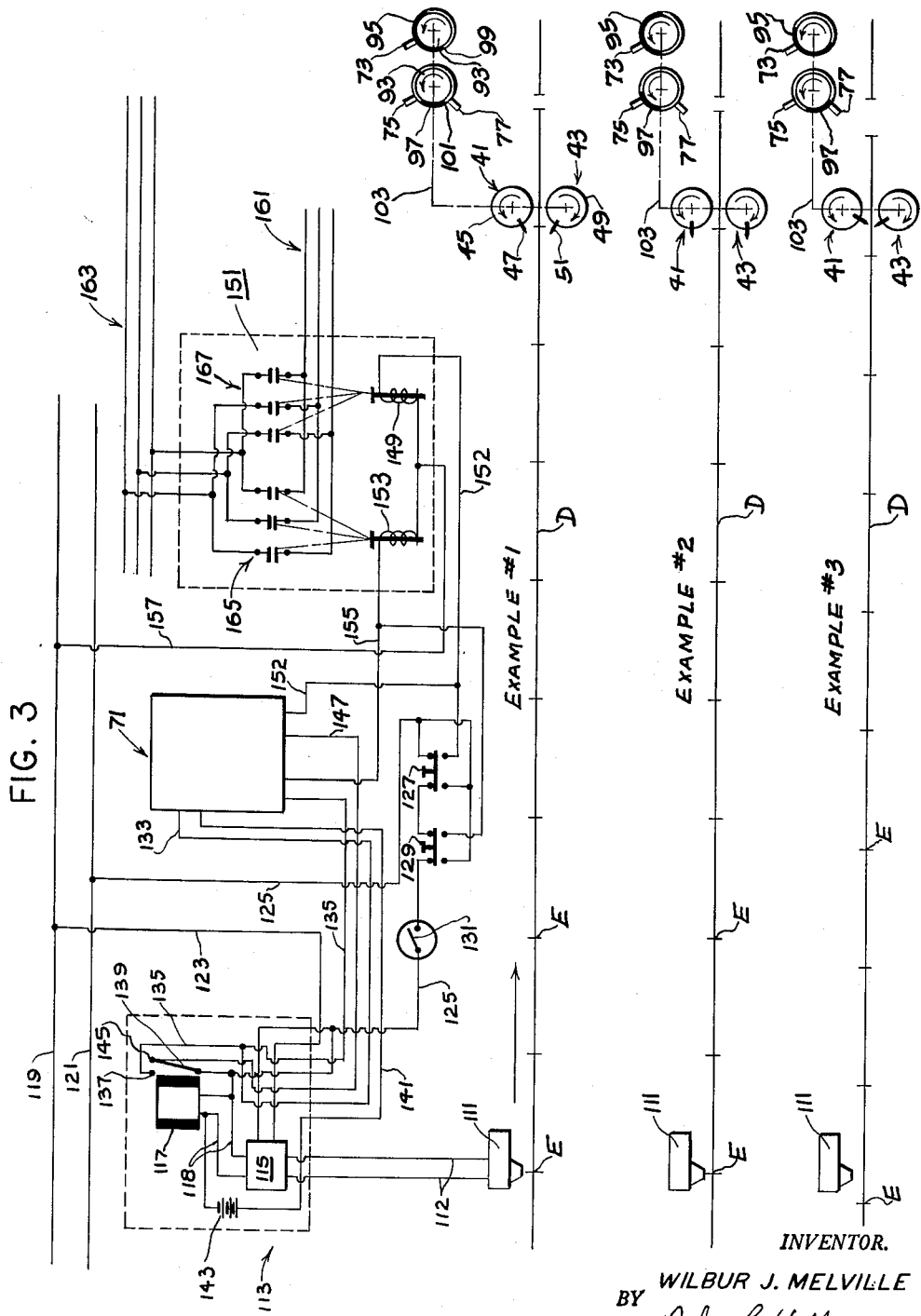

3,084,579
CONTROL MEANS FOR REGISTRATION
CONTROL DEVICE
Wilbur J. Melville, Memphis, Tenn.
(612 Bloomfield Ave., Clifton, N.J.)
Filed Apr. 29, 1959, Ser. No. 809,693
6 Claims. (Cl. 83—74)

This invention relates to a registration control device to be used in conjunction with known equipment to produce complete registration control over repeat cycle operation on machines and/or equipment which requires both advance and retard corrections.

In particular, the registration control device of the present invention is an improvement over the type of registration control equipment which type, in general, includes a photoelectric-reflection scanner, a control unit having a control relay, and some type of electro-mechanical correction mechanism built into the drive to the machine.

Registration control is designed for repeat cycle operations involving the precise measurement of material length or indexing of machine operation. In the above mentioned type of control, this is accomplished by measuring the interval between the operation of a synchronized control circuit and the disturbance of a beam of light. Thus, to identify length in a manner that can be utilized by the registration control, the measured material must be marked at intervals corresponding to the desired length, and the marks should produce an effective light beam disturbance in passing the scanner.

The synchronized occurrence of machine operation and light beam disturbance is the desired condition. In registration control devices of the above-mentioned type, the usual operation incorporates the use of a cam operated synchronizing switch which is in open position for a short interval during each cycle of the machine. If the mark on the material to be measured passes the scanner during the open interval of the switch, the marked position and the machine operation are synchronized and no control action results. If synchronization is not within desired limits, the marks will pass the scanner during the closed period of the synchronizing switch. The light disturbance due to the mark causes the registration relay to be energized. Corrective action is then applied through externally associated devices.

In the above-mentioned type of registration control equipment using the above-mentioned principle of operation, correction could only be applied in one direction. In certain machines, as for example, a corrugator with which the present invention is hereinafter described as being employed, and which is used to combine several sheets of paper to form corrugated paper board, errors in cut lengths of finished board occur in either direction (i.e., long or short). The reason for this is that there is no positive drive to the cut-off knives, nor is there a positive feed to the board entering the knives. Even with the exercise of extreme caution in operation, slippage can and does occur in either direction almost continuously, and as the errors which do occur are of various degrees and erratic as to direction (long or short), it is readily seen that it is impossible to acquire precision length cut-off by correcting for error in one direction only.

Thus, the principal object of the present invention is to improve upon registration control equipment of the above-described type to provide registration correction in both advance and retard directions.

A further object is to provide an attachment device which is adapted to be used in conjunction with existing registration control equipment and to provide for registration control in both advance and retard directions.

A further object is to provide such a device which functions to produce instant correction for out-of-register conditions so that the accuracy of the machine may be continuously maintained.

Although the invention has been described as being employed with a corrugator machine, it will be understood that the invention may be used with other machines of repeat cycle operations without departing from the spirit and scope of the present invention.

The means by which the foregoing and other objects of the present invention are accomplished and the manner of their accomplishment will be readily understood from the following specification upon reference to the accompanying drawings, in which:

FIG. 1 is a schematic view of the present invention illustrated in conjunction with a corrugator.

FIG. 2 is a prospective view of the timing device of the present invention with the cover thereof being broken away for purposes of illustration.

FIG. 3 is a schematic view of a portion of the apparatus of FIG. 1, showing three examples of the position of the material relative to the machine.

Referring now to the drawings in which the various parts are indicated by reference characters, the corrugator 11, with which the present invention is herein disclosed as being used, is described, in general, as follows: One sheet of paper called the medium A is fed from roll 13 and corrugated between two fluted surface hot steel rolls 15, 17. Corrugated medium A is then glued to a flat paper sheet called first liner B which is fed from roll 20. This gluing process is performed under extreme heat and high pressure between a smooth surfaced steel roll 19 and fluted roll 17. Previous to the heating of first liner B and medium A, an adhesive is applied to the tips of the flutes of the medium A by glue applicator roll 21. The combined sheets A and B leaving the pressure roll 19 and fluted roll 17 are known as a sheet of "single face," and designated in the drawings as at AB. The next step is the addition of a second liner C, which is fed from a roll 22. Adhesive is applied by roll 23 to the exposed tips of the flutes of single face AB immediately preceding the combining of second liner C with the single face.

The next and final step in the making of the corrugated board is the application of pressure heat to the combined sheets. This is accomplished by a plurality of steel rolls 25, applying the pressure while the combined sheets, now known as "board" and designated as at D, are drawn over hot steel plates 27. The duration of this pressure and heat application varies with different thicknesses of paper used in the board and is regulated by the speed of board movement across the plates 27.

All traction or driving force applied to board D during this final operation is derived from the friction or traction effect of the board being held between two heavy cotton belts 29 and 31, one above and one below the board. These belts are driven mechanically and in perfect unison by drums or pulleys 33, 35, respectively, which belts, in addition, are respectively led over idler pulleys 37, 39.

Leaving this final combining, baking and conditioning section of corrugator 11, the board D is now hard, rigid, and ready to be cut to desired sizes. Suitable cutting means is provided, as rotary knives 41, 43. Rotary knife 41 includes the usual steel shaft or knife bar 45 and knife blade 47 attached thereto and projecting therefrom. Likewise, rotary knife 43 includes knife bar 49 and knife blade 51. Rotary knives 41 and 43 are disposed one above the other and are coupled together for synchronized movement with the adjacent surfaces moving in the direction of travel of board D so that the knife blades 47, 51 produce a shearing action on the board D as it passes between bars 45, 49.

The desired cut-length of board D is produced by adjusting the speed of rotation of rotary knives 41, 43, relative to the speed of travel of board D. Rotary knives 41, 43 are primarily driven by the same force which drives traction belts 29, 31, so that there will be maintained an approximate synchronization between travel of board D and the cutting action. Between the primary driving force, which is illustrated as motor 53, and rotary knives 41, 43 is a variable speed transmission 55 of the split sheave type. Variable speed transmission 55 is of usual construction and includes a driving sheave 57 mounted on a shaft 59 and a driven sheave 61 mounted on a shaft 63. Sheaves 57, 61 are coupled together by a belt 65. This variable speed transmission 55, which is familiar to those skilled in the art and need not be described in further detail, is the means through which the rotary knives 41, 43 are timed to produce the desired cut lengths of board D. Suitable coupling means is provided between motor 53 and pulleys 33, 35 which coupling means is indicated diagrammatically as by line 67 and likewise suitable coupling means is provided for coupling motor 53 and shaft 59, which latter coupling means is indicated diagrammatically as at line 69.

From the foregoing description, it should be readily understood why slippage can and does continuously occur in both the board feed to the rotary knives 41, 43 and in the rotation of the knives, which slippage will produce errors causing both long and short cut-lengths of board. Precise, two direction registration control as contemplated in the present invention can eliminate these errors and produce board cut-lengths to exact predetermined size. This accurate cutting of the board will eliminate all trim scrap at the next operation and permit the use of preprinted first liners in the manufacture of the board.

Having described one type of machine with which the present invention is adapted to be used, a detailed description of the present invention in conjunction therewith follows.

The timing means of the present invention hereinafter designated timer 71 includes three pairs of normally open contacts under control of a rotor, which is synchronized with the machine operation that must be kept under positive registration control. Although various types of normally open, momentary contact, single pole switch devices may be used other than that shown in the drawings, the principle of operation of the present invention remains the same. In the present drawings, said normally open contacts are illustrated in the form of three pairs of spring loaded, carbon graphite brushes, i.e., a first pair of brushes 73, a second pair of brushes 75 and a third pair of brushes 77. The pairs of brushes 73, 75, and 77 are respectively carried in insulated brush holders 79, which holders are, in turn, supported by adjustable (arc-wise) brackets 81, 83, so that the pairs of brushes 73, 75 are carried by bracket 81 in lateral alignment and the pair of brushes 77 are carried by bracket 83 at approximately 90 degrees relative to the pair of brushes 75.

The rotor 85 of timer 71 is fixedly mounted on a shaft 87 extending axially thereof, which shaft 87 is rotatably mounted in two bearing stands, i.e., a forward stand 89 and a rearward stand 90, fixedly supported from the base 91 of timer 71. Rotor 85 comprises a cylindrical insulating body 93 carrying two parallel arcuate segments, i.e., a first segment 95 and a second segment 97, formed of any suitable low resistant electrical conductor material, as for example, bronze or silver. For smooth and efficient operation, segments 95, 97 are embedded in insulating body 93 and held rigid and flush with the surface of same. The leading edges 99, 101 (as related to the direction of rotation) of segments 95, 97 respectively are disposed in lateral alignment. The length of first segment 95 is equal to approximately 180 degrees of the circumference of rotor 85 while second segment 97 is equal to approximately 60 degrees of the circumference of the rotor. The relationship of segments 95, 97 and the pairs of brushes 73, 75, and 77 is such that segment 95 intermittently contacts the pair of brushes 73 as rotor 85 is rotated and such that segment 97 intermittently contacts the pairs of brushes 75, 77, respectively, as the rotor is rotated. Thus, a first switch, including the pair of brushes 73 and segment 95, is established which is closed when the segment 95 contacts the brushes 73 and which is open when the brushes 73 are uncontacted; a second switch, including the pair of brushes 75 and segment 97, is established which is closed when the segment 97 contacts the brushes 75 and which is open when the brushes 75 are uncontacted; and a third switch, including the pair of brushes 77 and segment 97, is established which is closed when the segment 97 contacts the brushes 77 and which is open when the brushes 77 are uncontacted.

The forward end of shaft 87 terminates at the forward end of bearing stand 89, while the rearward end of shaft 87 passes through the rearward bearing stand 90 and terminates in a suitable coupling 103 which is utilized to keep the motor 85 in absolute synchronization with the machine operation. The entire operating mechanism of timer 71, with the exception of coupling 103 and adjusting knobs 105, and 107, is enclosed in a protective housing 109, supported from base 91. Adjusting knobs 105, 107 which are respectively attached to brackets 81, 83 are adapted to be turned for the arc-wise adjustment of the brackets and therefore the adjustment of brushes 73, 75, and 77. Through coupling 103, shaft 87 is coupled to the end of the upper rotary knife 41, which is indicated diagrammatically in FIG. 1, and, as heretofore explained, rotary knives 41, 43 are in synchronization. Thus, exact synchronization is maintained between the action of knives 41, 43 and timer 71.

Referring now to the electrical connections of the present invention with the electrical system of corrugator 11, a suitable scanner 111 of well-known construction is disposed adjacent board D, along the line of travel of the board between cotton belts 29, 31 and rotary knives 41, 43. Scanner 111 is connected as by leads 112 to a suitable control unit 113, best shown in the dashed line square in FIG. 3, and which includes the usual amplifier 115, and a relay 117 fed by the amplifier as through leads 118. A power source, not shown, which is preferably 115 volts 60 cycles is brought in by feeders 119, 121 and fed into control unit 113 by a lead 123 and a lead 125, which lead 125 has interposed therein a pair of push-button switches 127, 129 and a main switch 131. The foregoing description of control unit 113 and the connections thereof is of conventional construction and it will be understood by those skilled in the art that the usual marks, as marks E, that are printed on board D at spaced intervals, will cause a light disturbance or signal as the marks pass scanner 111 which signal will be amplified by the amplifier 115 and, in turn, will cause energization of relay 117.

The timer 71 of the present invention is connected into the above circuit as follows: A lead 133 connects one of the first pair of brushes 73 to a lead 135, that is connected to one of the second pair of brushes 75, and also is connected to contact 137 of the relay switch 139. The other of the first pair of brushes 73 is connected by a lead 141 to a battery 143 or other source of electrical power which, in turn, is connected to the coil of the relay 117, the other side of the coil being connected to the arm of switch 139 by suitable leads which switch is also connected to lead 125 on the amplifier side of switch 131.

The other contact 145 of switch 139 is connected by a lead 147 to one of the third pair of brushes 77. The other of the third pair of brushes 77 is connected to a solenoid 149 of a magnetic controller 151 by a lead 152 which is also connected to switch 127. Magnetic controller 151 is of conventional construction and includes another solenoid 153, which is connected to the other of the second pair of brushes 75 by a lead 155, which is also connected to switch 129. The other sides of the coils 153, 149 are respectively connected to main lead 119 by a lead 157. Magnetic controller 151 is connected to a reversible correction motor 159 by the three leads, indicated as at 161. Controller 151 operates in the usual manner to connect a three-phase power source not shown, which is led in by the three leads indicated as at 163, respectively to the two groups of switches 165 and 167, which are respectively operably connected to solenoids 153, 149 and arranged so that when solenoid 153 is energized, and with solenoid 149 being de-energized, switches 165 will be closed to run the motor 159 in one direction (an advance direction, as will be more apparent in the description to follow) and when the solenoid 149 is energized with solenoid 153 being de-energized, the switches 167 are closed to run the motor 159 in the opposite direction (a retard direction).

Motor 159 is coupled by suitable coupling means, indicated diagrammatically by the line 168, to a worm 169 of a differential transmission 170. Differential transmission 170 is of conventional construction and the out-put shaft 63 of variable speed transmission 55, which is connected to the in-put shaft 171 of the differential transmission by suitable connection means indicated diagrammatically as at 173, causes rotation of cage 175 which, in turn, causes cage gear 177 to drive an out-put shaft 179 of transmission 170 through gear 181. Out-put shaft 179 is connected to rotary knives 41, 43 by suitable coupling means indicated diagrammatically as at 182. It will be understood that the gear 183 of differential transmission 169, which gear 183 is keyed to a shaft 185, is normally held stationary with a worm wheel 187 engaging worm 169. In other words, when no correction is required, motor 159 is not running and, therefore, worm 169 is stationary which holds worm wheel 187, shaft 185, and gear 183 stationary.

From the foregoing, it will be understood that motor 53 drives rotary knives 41, 43 through variable transmission 55 and differential transmission 170. It will further be understood that drive of motor 159 in one direction will cause a shift in one direction of the position of rotary knives 41, 43 relative to pulleys 33, 35, and drive of motor 159 in the other direction will cause an opposite shift of the knives relative to the pulleys.

In the operation of the device of the present invention, it will be understood that main switch 131 must be closed in order to make the scanner 111 and the registration control device operative, and if for any reason it is desired to run the machine without any correction by the registration control device, as for example, during the warm-up period, the switch 131 is kept open. Also, from the circuit shown in FIG. 3, it will be understood that switches 127, 129 are useful to manually control the advance or retard of knives 41, 43 relative to board D, as for example, to set up the machine in preparation for a run. Thus, to retard knives 41, 43, switch 127 is pushed downwardly to complete the circuit to solenoid 149 direct from feeders 119, 121 and at the same time cut out the circuit to the control unit 113. In a similar manner, to advance knives 41, 43, switch 129 is pushed downwardly to complete the circuit to solenoid 153 direct from feeders 119, 121, and at the same time cut out the circuit to the control unit 113.

To further describe the operation of the device of the present invention, when the marks E pass scanner 111, and rotary knives 41, 43 are in synchronization therewith, no corrective action is necessary and correction motor 159 will not run. This condition of synchronization is illustrated at Example No. 1 in FIG. 3. The relative position of rotor 85 and rotary knives 41, 43 is shown by the two somewhat diagrammatic cross-sectional illustrations of the rotary knives in this example (the cross section to the left being taken as through segment 97 and the one to the right as through segment 95, at the same instant). Thus, it will be seen that when the feed of board D and the knives 41, 43 are in synchronization, segment 97 is clear of the second pair of brushes 75 and the third pair of brushes 77. Also, it will be seen that the first pair of brushes 73 are in contact with first segment 95, which closes a holding circuit to relay 117, to hold the switch 139 against contact 137 until the first pair of brushes 73 leave the first segment 95. It should be explained at this point that switch 139 was initially shifted to contact 137 from a normal position of engagement with contact 145 by the disturbance of light on scanner 111 when the mark E passed the scanner. This action took place since the scanner is attached to amplifier 115, which, in turn, energizes the coil of relay 117 to draw the switch 139 to contact 137. When the first pair of brushes 73 leave first segment 95, then the switch 139 will return to its position of engagement with contact 145, as shown in the drawing. It will be understood that the aforementioned holding circuit will be completed when switch 139 first contacts the contact 137 as above described, since the circuit is completed through lead 135, lead 133, the first pair of brushes 73, lead 141, battery 143, the coil of relay 117 and back to switch 139.

Example No. 2 of FIG. 3 illustrates the condition which exists when the rotary knives 41, 43 are retarded relative to the marks E when the marks pass scanner 111. In this example, the complete system is not shown but only scanner 111, board D, rotary knives 41, 43 and the two diagrammatic illustrations of the rotor 85, which diagrammatic views are similar to those of Example No. 1, except a different position is shown. It will be seen in Example No. 2 that second segment 97 is still in contact with the second pair of brushes 75. This closes an advance circuit to solenoid 153, since switch 139 is in engagement with contact 137 due to the fact that the scanner has received the signal from mark E. For clarification, said advance circuit is traced as follows: Feeder 119; lead 157; solenoid 153; lead 155; the second pair of brushes 75; segment 97; lead 135; contact 137; switch 139; lead 125; switches 131, 129 and 127; lead 125; and feeder 121. The above described energization of solenoid 153 causes the correction motor 159 to run in a direction to shift or advance rotary knives 41, 43 relative to the movement of board D. This advance is due to the action of the differential transmission 170, since worm 169 causes shift of gear 183 in a direction to cause gear 177 and gear 181 to shift the rotary knives in an advance direction. This advance will continue as long as segment 97 remains in contact with the second pair of brushes 75. Also, segment 95 keeps the holding circuit closed as heretofore explained, which, in turn, keeps switch 139 in engagement with contact 137 and away from contact 145 whereby the retarding circuit (hereinafter more fully explained) is open. All during this time, the late position or timing of the rotary knives 41, 43 is corrected.

In Example No. 3 illustrated in FIG. 3, the feed of board D to the rotary knives 41, 43 is late and scanner 111 receives no signal (light disturbance) when it is due.

With rotary knives 41, 43 in an advanced position relative to the board, second segment 97 comes in contact with the third pair of brushes 77, and as relay 117 has not yet acted, the retarding circuit to solenoid 149 is closed and the correction motor 159 moves rotary knives 41, 43 in a retarding direction relative to board D. For clarification, said retarding circuit is traced as follows: Feeder 119; lead 157; solenoid 149; lead 152; the third pair of brushes 77; segment 97; lead 147; contact 145; switch 139; lead 125; switches 131, 129, and 127; lead 125; and feeder 121. This above described retarding of the rotary knives 41, 43 continues until the scanner 111 receives a signal and board D is again in proper timing with the knife action. When scanner 111 receives a signal, the control relay 117 will open the said retarding circuit and will keep that circuit open until segment 95 leaves the first pair of brushes 73 and allows the relay switch 139 to go back to its original position.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a repeat cycle machine of the type including rotatable cutting means, feed rolls positioned to feed said cutting means a continuous piece of material marked by spaced indicia, drive means for driving said feed rolls, motion transmission means for transmitting motion from said drive means to said cutting means so that said cutting means is adapted to cut said material into predetermined lengths, photoelectric scanning means located ahead of said cutting means and being responsive to the indicia on said piece of material before cut, and control means including a controller and a reversible motor means controlled thereby and connected to said motion transmission means for moving the position of said cutting means relative to said feed rolls and said indicia; the improvement for maintaining said cutting means in register with said indicia; said improvement comprising a timer including a shaft, means coupling said shaft to said cutting means, a cylindrical insulator mounted on said shaft for rotation therewith, a first electrical conductor segment mounted on said insulator circumferentially thereof and extending substantially 180 degrees around the circumference of said insulator, said first segment including a leading edge, a second electrical conductor segment mounted on said insulator circumferentially thereof in parallel spaced relationship to said first segment and extending substantially 60 degrees around the circumference of said insulator, said second segment including a leading edge disposed in substantial alignment with said leading edge of said first segment, a first pair of brushes disposed in the path of said first segment whereby to establish a first switch which is closed when said first pair of brushes are contacted by said first segment and open when the first pair of brushes are uncontacted, a second pair of brushes in alignment with said first pair of brushes disposed in the path of said second segment whereby to establish a second switch which is closed when said second pair of brushes are contacted by said second segment and open when the second pair of brushes are uncontacted, a third pair of brushes disposed in the path of said second segment whereby to establish a third switch which is closed when said third pair of brushes are contacted by said second segment and open when the third pair of brushes are uncontacted, said third pair of brushes being spaced circumferentially from said second pair of brushes an angular distance slightly greater than 60 degrees whereby said second segment is adapted to be positioned intermediate said second and third pairs of brushes in spaced relation thereto, the relationship of said cutting means and said second segment being such that when said cutting means is in a registered position with said indicia and an indicium is positioned under said photoelectric scanning means said second segment is positioned intermediate said second and third pairs of brushes; a relay including a single pole double throw switch having a movable arm and a first contact normally engaged by said arm and having a second contact normally disengaged from said arm, said relay being electrically coupled to said scanning means and operable in response thereto upon operation of said scanning means by said indicia to cause said relay arm to disengage from said first contact and engage said second contact, a holding circuit means including a source of electrical power and said first switch, said first switch being arranged so that said first switch is closed during a portion of the cycle of said cutting means when said cutting means is adjacent one of said indicia, said holding circuit means being operably connected to said relay to hold said arm in engagement with said second contact for a portion of the cycle of said cutting means, an advance circuit means including a source of electrical power and said second switch, said second switch being arranged so that when said cutting means is in a retarded disposition relative to said indicia said second switch is closed, said advance circuit being connected to said second contact and to said controller, and said advance circuit means being arranged so that engagement of said second contact by said arm and closure of said second switch is effective to complete said advance circuit means and impart a current to said controller to turn said motor means in an advanacing direction and through said motion transmission means to move directly said cutting means before cutting said material to a position of substantially exact register with said indicia, a retarding circuit means including a source of electrical power and said third switch, said third switch being arranged so that when said cutting means is in an advanced position relative to said indicia said third switch is closed, said retarding circuit means being connected to said first contact and to said controller, said retarding circuit means being arranged so that engagement of said first contact by said arm and closure of said third switch is effective to complete said third circuit means and impart a current to said controller to turn said motor means in a retarding direction and through said motor transmission means to move directly said cutting means before cutting said material to a position of substantially exact register with said indicia, and said second and third switches being arranged so that the switches are open when said cutting means is in register with said indicia and an indicium is positioned under said photoelectric scanning means whereby no correction is made.

2. In a repeat cycle machine of the type including rotatable cutting means, feed rolls positioned to feed said cutting means a continuous piece of material marked by spaced indicia, drive means for driving said feed rolls, motion transmission means for transmitting motion from said drive means to said cutting means so that said cutting means is adapted to cut said material into predetermined lengths, photoelectric scanning means located ahead of said cutting means and being responsive to the indicia on said piece of material before cut, and control means including a controller and a reversible motor means controlled thereby and connected to said motor transmission means for moving the position of said cutting means relative to said feed rolls and said indicia; the improvement for maintaining said cutting means in register with said indicia, said improvement comprising a relay including a single pole double throw switch having a movable arm and a first contact normally engaged by said arm and having a second contact normally disengaged from said arm, said relay being electrically coupled to said scanning means and operable in response thereto upon operation of said scanning means by said indicia to cause said relay arm to disengage from said first contact and engage said second contact, a holding circuit means including a source of electrical power and a normally open first switch, said first switch being operably connected to said cutting means and arranged so that said first switch is closed during a portion of the cycle of said cutting means when said cutting means is adjacent one of said indicia, said holding circuit means being operably connected to said relay to hold said arm in engagement with said second contact for a portion of the cycle of said cutting means, an advance circuit means including a source of electrical power and a normally open second switch, said second switch being operably connected to said cutting means and arranged so that when said cutting means is in a retarded disposition relative to said indicia said second switch is closed, said advance circuit being connected to said second contact and to said controller, and said advance circuit means being arranged so that engagement of said second contact by said arm and closure of said second switch is effective to complete said advance circuit means and impart a current to said controller to turn said motor means in an advancing direction and through said motion transmission means to move directly said cutting means before cutting said material to a position of substantially exact register with said indicia, a retarding circuit means including a source of electrical power and a normally open third switch, said third switch being operably connected to said cutting means and arranged so that when said cutting means is in an advanced position relative to said indicia said third switch is closed, said retarding circuit means being connected to said first contact and to said controller, said retarding circuit means being arranged so that engagement of said first contact by said arm and closure of said third switch is effective to complete said third circuit means and impart a current to said controller to turn said motor means in a retarding direction and through said motion transmission means to move directly said cutting means before cutting said material to a position of substantially exact register with said indicia, and said second and third switches being arranged so that the switches are open when said cutting means is in register with said indicia and an indicium is positioned under said photoelectric scanning means whereby no correction is made.

3. In a repeat cycle machine of the type including cutting means, feed rolls positioned to feed said cutting means a continuous piece of material marked by spaced indicia, drive means for driving said feed rolls, motion transmission means for transmitting motion from said drive means to said cutting means so that said cutting means is adapted to cut said material into predetermined lengths, photoelectric scanning means located ahead of said cutting means and being responsive to the indicia on said piece of material before cut, and control means connected to said motion transmitting means for moving the position of said cutting means relative to said feed rolls and said indicia; the improvement for maintaining register of said cutting means with said indicia, said improvement comprising a timer including a shaft, means coupling said shaft to said cutting means for the conjoint rotation of said shaft with said cutting means, a cylindrical insulator mounted on said shaft for rotation therewith, a first electrical conductor segment mounted on said insulator circumferentially thereof and extending substantially 180 degrees around the circumference of said insulator, said first segment including a leading edge, a second electrical conductor segment mounted on said insulator circumferentially thereof in parallel spaced relationship to said first segment and extending substantially 60 degrees around the circumference of said insulator, said second segment including a leading edge disposed in substantial alignment with said leading edge of said first segment, a first pair of brushes disposed in the path of said first segment whereby to establish a first switch which is closed when said first pair of brushes are contacted by said first segment and open when the first pair of brushes are uncontacted, a second pair of brushes in alignment with said first pair of brushes disposed in the path of said second segment whereby to establish a second switch which is closed when said second pair of brushes are contacted by said second segment and open when the second pair of brushes are uncontacted, and a third pair of brushes disposed in the path of said second segment whereby to establish a third switch which is closed when said third pair of brushes are contacted by said second segment and open when the third pair of brushes are uncontacted, said third pair of brushes being spaced circumferentially from said second pair of brushes an angular distance slightly greater than 60 degrees whereby said second segment is adapted to be positioned intermediate said second and third pairs of brushes in spaced relation thereto, the relationship of said cutting means and said second segment being such that when said cutting means is in a registered position with said indicia and an indicium is positioned under said photoelectric scanning means said second segment is positioned intermediate said second and third pairs of brushes; a normally open first circuit means responsive to said photoelectric scanning means for the closing thereof upon passage of an indicium by the scanning means, said first switch being interposed in said first circuit means, a normally open second circuit means operably coupled to said first circuit means and said control means, said second switch being interposed in said second circuit means, said second circuit means being arranged so that closure of said second switch when said first circuit means is closed is effective to close said second circuit means, closure of said second circuit means being effective through said control means and said motion transmitting means to advance directly said cutting means relative to said material before the cutting thereof by substantially the exact amount to correct for a lagging condition of said cutting means, a normally open third circuit means operably coupled to said first circuit means and said control means, said third switch being interposed in said third circuit means, said third circuit means being arranged so that closure of said third switch when said first circuit means is open is effective to close said third circuit means, closure of said third circuit means being effective through said control means and said motion transmitting means to retard directly said cutting means relative to said material before the cutting thereof by substantially the exact amount to correct for an advanced condition of said cutting means.

4. In a repeat cycle machine of the type including cutting means, feed rolls positioned to feed said cutting means a continuous piece of material marked by spaced indicia, drive means for driving said feed rolls, motion transmission means for transmitting motion from said drive means to said cutting means so that said cutting means is adapted to cut said material into predetermined lengths, photoelectric scanning means located ahead of said cutting means and being responsive to the indicia on said piece of material before cut, and control means connected to said motion transmitting means for moving the position of said cutting means relative to said feed rolls and said indicia; the improvement for maintaining register of said cutting means with said indicia, said improvement comprising a first switch operably coupled to said cutting means and arranged so that said first switch is closed during a portion of the cycle of said cutting means when said cutting means is adjacent one of said indicia, a second switch operably coupled to said cutting means and arranged so that said second switch is closed during the first part of said portion of the cycle when said first switch is closed, a third switch operably coupled to said cutting means and arranged so that said third switch is closed during the last part of said portion of the cycle when said first switch is closed, a normally open first circuit means responsive to said photoelectric scanning means for the closing thereof upon passage of an indicium by the scanning means, said first switch being interposed in said first circuit means, a normally open second circuit means operably coupled to said first circuit means and said control means, said second switch being interposed in said second circuit means, said second circuit means being arranged so that closure of said second switch when said first circuit means is closed is effective to close said second circuit means, closure of said second circuit means being effective through said control means and said motion transmitting means to advance directly said cutting means relative to said material before the cutting thereof by substantially the exact amount to correct for a lagging condition of said cutting means, a normally open third circuit means operably coupled to said first circuit means and said control means, said third switch being interposed in said third circuit means, said third circuit means being arranged so that closure of said third switch when said first circuit means is open is effective to close said third circuit means, closure of said third circuit means being effective through said control means and said motion transmitting means to retard directly said cutting means relative to said material before the cutting thereof by substantially the exact amount to correct for an advanced condition of said cutting means.

5. A control system for synchronizing the rotation of a first object, driven by drive means through a motion transmission means, with the indicia on a moving second object; said control system comprising photoelectric scanning means adapted to be responsive to said indicia, means including a controller and a reversible motor means controlled thereby and adapted to be connected to said motion transmission means for moving the position of said first object relative to said indicia, a timer including a shaft, means for coupling said shaft to said first object for rotation therewith, a cylindrical insulator mounted on said shaft for rotation therewith, a first electrical conductor segment mounted on said insulator circumferentially thereof and extending substantially 180 degrees around the circumference of said insulator, said first segment including a leading edge, a second electrical conductor segment mounted on said insulator circumferentially thereof in parallel spaced relationship to said first segment and extending substantially 60 degrees around the circumference of said insulator, said second segment including a leading edge disposed in substantial alignment with said leading edge of said first segment, a first pair of brushes disposed in the path of said first segment whereby to establish a first switch which is closed when said first pair of brushes are contacted by said first segment and opened when said first pair of brushes are uncontacted, a second pair of brushes in alignment with said first pair of brushes disposed in the path of said second segment whereby to establish a second switch which is closed when said second pair of brushes are contacted by said second segment and opened when said second pair of brushes are uncontacted, a third pair of brushes disposed in the path of said second segment whereby to establish a third switch which is closed when said third pair of brushes are contacted by said second segment and opened when said third pair of brushes are uncontacted, said third pair of brushes being spaced circumferentially from said second pair of brushes an angular distance slightly greater than 60 degrees whereby said second segment is adapted to be positioned intermediate said second and third pairs of brushes in spaced relation thereto, the relationship of said first object and said second segment being adapted to be such that when said first object is in a registered position with said indicia and an indicium is positioned under said photoelectric scanning means said second segment is positioned intermediate said second and third pairs of brushes; a relay including a single pole double throw switch having a movable arm and a first contact normally engaged by said arm and having a second contact normally disengaged from said arm, said relay being electrically coupled to said scanning means and operable in response thereto upon operation of said scanning means by said indicia to cause said relay arm to disengage from said first contact and engage said second contact, a holding circuit means including a source of electrical power and said first switch, said first switch being arranged so that said first switch is adapted to be closed during a portion of the cycle of said first object when said first object is near synchronization with one of said indicia, said holding circuit means being operably connected to said relay to hold said arm in engagement with said second contact for a portion of the cycle of said first object, an advance circuit means including a source of electrical power and said second switch, said second switch being arranged so that when said first object is in a retarded disposition relative to said indicia said second switch is adapted to be closed, said advance circuit being connected to said second contact and to said controller, said advance circuit means being arranged so that engagement of said second contact by said arm and closure of said second switch is effective to complete said advance circuit means and impart a current to said controller to turn said motor means in an advancing direction and through said motion transmission means is adapted to move directly and substantially immediately said first object to a position of register with said indicia, a retarding circuit means including a source of electrical power and said third switch, said third switch being arranged so that when said first object is in an advance position relative to said indicia said third switch is adapted to be closed, said retarding circuit means being connected to said first contact and to said controller, said retarding circuit means being arranged so that engagement of said first contact by said arm and closure of said third switch is effective to complete said third circuit means and impart a current to said controller to turn said motor means in a retarding direction and through said motor transmission means is adapted to move directly and substantially immediately said first object to a position of register with said indicia, and said second and third switches being arranged so that the switches are adapted to be open when said first object is in register with said indicia and an indicium is positioned under said photoelectric scanning means whereby no correction is made.

6. A control system for synchronizing the movement of a first object, driven by drive means through a motion transmission means, with the indicia on a second object; said control system comprising photoelectric scanning means adapted to be responsive to said indicia, means adapted to be connected to said motion transmission means for moving the position of said first object relative to said indicia, a first switch adapted to be operably coupled to said first object and arranged so that said first switch is closed during a portion of the time of the movement of said first object, a second switch adapted to be operably coupled to said first object and arranged so that said second switch is closed during the first part of said portion of the time when said first switch is closed, a third switch adapted to be operably coupled to said first object and arranged so that said third switch is closed during the last part of said portion of the time when said first switch is closed, a normally open first circuit means responsive to said photoelectric scanning means for the closing thereof upon passage of an indicium by the scanning means, said first switch being interposed in said first circuit means, a normally open second circuit means operably coupled to said first circuit means and said control means, said second switch being interposed in said second circuit means, said second circuit means being arranged so that closure of said second switch when said first circuit means is closed is effective to close said second circuit means, closure of said second circuit means being adapted to be effective through said control means and said motion transmission means to advance directly and substantially immediately said first object relative to said indicia by substantially the exact amount to correct for a lagging condition of said first object, a normally open third circuit means operably coupled to said first circuit means and said control means, said third switch being interposed in said third circuit means, said third circuit means being arranged so that closure of said third switch when said first circuit means is open is effective to close said third circuit means, closure of said third circuit means being adapted to be effective through said control means and said motion transmission means to retard directly and substantially immediately said first object relative to said second object by substantially the exact amount to correct for an advance condition of said first object.

References Cited in the file of this patent

UNITED STATES PATENTS

| | | |
|---|---|---|
| 1,913,153 | Salardi | June 6, 1933 |
| 1,961,538 | Weber | June 5, 1934 |
| 2,002,374 | King | May 21, 1935 |
| 2,050,316 | Gulliksen | Aug. 11, 1936 |
| 2,105,185 | Degnan | Jan. 11, 1938 |
| 2,429,500 | Wolfner | Oct. 21, 1947 |
| 2,529,161 | Kelling | Nov. 7, 1950 |
| 2,543,077 | Treseder | Feb. 27, 1951 |
| 2,655,994 | Vandenberg | Oct. 20, 1953 |
| 2,966,086 | Sjostrom | Dec. 27, 1960 |